US006978835B1

(12) United States Patent
Reddy et al.

(10) Patent No.: US 6,978,835 B1
(45) Date of Patent: Dec. 27, 2005

(54) METHODS OF CEMENTING IN SUBTERRANEAN FORMATIONS

(75) Inventors: B. Raghava Reddy, Duncan, OK (US); Dennis W. Gray, Comanche, OK (US); Bryan K. Waugh, Comanche, OK (US); Jan Pieter Vijn, Leiderdorp (NL)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 10/963,036

(22) Filed: Oct. 11, 2004

(51) Int. Cl.$^7$ .............................................. E21B 33/13
(52) U.S. Cl. ..................................... 166/294; 166/300
(58) Field of Search ........................ 166/285, 292–295, 166/300; 106/724, 725, 727, 728

(56) References Cited

U.S. PATENT DOCUMENTS

| | | | |
|---|---|---|---|
| 2,805,719 A | 9/1957 | Anderson | |
| 2,905,565 A | 9/1959 | Dietz et al. | |
| 3,268,563 A | 8/1966 | Shen et al. | |
| 3,359,225 A | 12/1967 | Weisend | |
| 3,409,080 A | 11/1968 | Harrison | |
| 3,558,335 A | 1/1971 | Messenger | |
| 3,748,159 A | 7/1973 | George | |
| 3,952,805 A | 4/1976 | Persinski et al. | |
| 4,011,092 A | 3/1977 | Yue | |
| 4,036,660 A | 7/1977 | Persinski et al. | |
| 4,190,454 A | 2/1980 | Yamagisi et al. | |
| 4,204,877 A | 5/1980 | Moorer et al. | |
| 4,476,029 A | 10/1984 | Sy et al. | |
| 4,500,357 A | 2/1985 | Brothers et al. | |
| 4,582,139 A | 4/1986 | Childs et al. | |
| 4,601,758 A | 7/1986 | Nelson | |
| 4,676,832 A | 6/1987 | Childs et al. | |
| 4,746,367 A | 5/1988 | Meyer | |
| 4,818,288 A | 4/1989 | Aignesberger et al. | |
| 4,883,125 A | 11/1989 | Wilson et al. | |
| 4,888,059 A * | 12/1989 | Yamaguchi et al. ......... | 106/823 |
| 4,941,536 A | 7/1990 | Brothers et al. | |
| 4,997,487 A | 3/1991 | Vinson et al. ............... | 106/804 |
| 5,038,863 A | 8/1991 | Bloys et al. | |
| 5,049,288 A | 9/1991 | Brothers et al. | |
| 5,049,446 A | 9/1991 | Blackwell et al. .......... | 428/364 |
| 5,076,852 A | 12/1991 | Bloys et al. | |
| 5,184,680 A | 2/1993 | Totten et al. ............... | 166/293 |
| 5,220,960 A | 6/1993 | Totten et al. ............... | 166/293 |
| 5,221,343 A | 6/1993 | Grauer et al. ............... | 106/729 |
| 5,236,501 A * | 8/1993 | Nomachi et al. ............ | 106/723 |
| 5,263,542 A | 11/1993 | Brothers ...................... | 166/293 |
| 5,264,470 A | 11/1993 | Eoff ............................. | 424/4 |
| 5,273,580 A | 12/1993 | Totten et al. ............... | 106/724 |
| 5,281,270 A | 1/1994 | Totten et al. ............... | 106/687 |
| 5,293,938 A | 3/1994 | Onan et al. .................. | 166/293 |
| 5,340,397 A | 8/1994 | Brothers | |
| 5,341,881 A | 8/1994 | Rodrigues et al. .......... | 166/293 |
| 5,398,759 A | 3/1995 | Rodrigues et al. .......... | 166/293 |
| 5,421,879 A | 6/1995 | Rodrigues .................... | 106/727 |
| 5,421,881 A | 6/1995 | Rodrigues et al. .......... | 106/809 |
| 5,447,197 A | 9/1995 | Rae et al. .................... | 166/293 |
| 5,472,051 A | 12/1995 | Brothers | |
| 5,484,478 A | 1/1996 | Brothers | |
| 5,494,516 A | 2/1996 | Drs et al. .................... | 106/819 |
| 5,503,671 A | 4/1996 | Casabonne et al. ......... | 106/717 |
| 5,503,672 A | 4/1996 | Bartler-Gouedard et al. ............................ | 106/819 |
| 5,536,311 A | 7/1996 | Rodrigues | |
| 5,547,506 A | 8/1996 | Rae et al. .................... | 106/730 |
| 5,547,612 A | 8/1996 | Austin et al. | |
| 5,609,681 A | 3/1997 | Drs et al. .................... | 106/802 |
| 5,672,203 A | 9/1997 | Chatterji et al. ............ | 106/808 |
| 5,698,512 A | 12/1997 | Austin et al. | |
| 5,871,577 A | 2/1999 | Chatterji et al. ............ | 106/808 |
| 5,932,344 A | 8/1999 | Ikemoto et al. ............. | 428/343 |
| 6,019,835 A | 2/2000 | Chatterji et al. ............ | 106/725 |
| 6,063,738 A | 5/2000 | Chatterji et al. ............ | 507/269 |
| 6,077,910 A | 6/2000 | Ikuta et al. ................. | 525/327.8 |
| 6,114,033 A | 9/2000 | Ikemoto et al. ............. | 428/343 |
| 6,156,808 A | 12/2000 | Chatterji et al. ............ | 516/116 |
| 6,173,778 B1 | 1/2001 | Rae et al. .................... | 166/293 |
| 6,227,294 B1 | 5/2001 | Chatterji et al. | |
| 6,297,202 B1 | 10/2001 | Chatterji et al. ............ | 507/261 |
| 6,308,777 B2 | 10/2001 | Chatterji et al. ............ | 166/293 |
| 6,376,580 B1 | 4/2002 | Ikuta et al. .................. | 524/5 |
| 6,417,142 B1 | 7/2002 | Chatterji et al. ............ | 507/265 |
| 6,419,016 B1 | 7/2002 | Reddy .......................... | 166/293 |
| 6,457,524 B1 | 10/2002 | Roddy ......................... | 166/293 |
| 6,497,283 B1 | 12/2002 | Eoff et al. ................... | 166/293 |
| 6,511,537 B1 | 1/2003 | Bartlet-Gouedard et al. ............................ | 106/727 |
| 6,630,021 B2 | 10/2003 | Reddy et al. ............... | 106/809 |
| 6,689,208 B1 | 2/2004 | Brothers ..................... | 106/794 |

(Continued)

FOREIGN PATENT DOCUMENTS

GB 1588130 4/1981 ........... C04B 13/28

OTHER PUBLICATIONS

Halliburton brochure entitled "CFR-2 Cement Friction Reducer" dated 1999.

(Continued)

Primary Examiner—Zakiya Walker
(74) Attorney, Agent, or Firm—Craig W. Roddy; Baker Botts, L.L.P.

(57) ABSTRACT

A method of retarding the set time of a cement composition comprising providing a cement composition that comprises water and a cement, and retarding the set time of the cement composition by including a copolymer retarder in the cement composition, wherein the copolymer retarder comprises olefinically unsaturated non-acrylate sulfonate monomers and olefinically unsaturated carboxylic acid monomers. Methods of cementing in a subterranean formation also are provided.

90 Claims, No Drawings

U.S. PATENT DOCUMENTS

| | | | |
|---|---|---|---|
| 6,715,552 B2 | 4/2004 | Eoff et al. | 166/293 |
| 6,722,433 B2 | 4/2004 | Brothers et al. | 166/288 |
| 6,743,288 B2 | 6/2004 | Eoff et al. | 106/724 |
| 6,770,604 B2 | 8/2004 | Reddy et al. | 507/224 |
| 6,793,730 B2 | 9/2004 | Reddy et al. | 106/677 |
| 6,796,378 B2 | 9/2004 | Reddy et al. | 166/293 |

OTHER PUBLICATIONS

Halliburton brochure entitled "CFR-3™ Cement Friction Reducer" dated 2004.

Halliburton brochure entitled "EZ-FLO Blending Additive" dated 2000.

Halliburton brochure entitled "GasStop HT Cement Additive" dated 1999.

Halliburton brochure entitled "Halad®-413 Fluid-Loss Additive" dated 1999.

Halliburton brochure entitled "Hi-Dense® Weight Additives" dated 1998.

Halliburton brochure entitled "HR®-25 Cement Retarder" dated 1999.

Halliburton brochure entitled "MICROMAX Weight Additive" dated 1999.

Halliburton brochure entitled "SCR-100 Cement Retarder" dated 1999.

Halliburton brochure entitled "SCR-500L™ High-Temperature Retarder" dated 2000.

Halliburton brochure entitled "SSA-1 Strength-Stabilizing Agent" dated 1998.

Halliburton brochure entitled "SSA-2 Coarse Silica Flour" dated 1999.

\* cited by examiner

METHODS OF CEMENTING IN SUBTERRANEAN FORMATIONS

CROSS REFERENCE TO RELATED APPLICATIONS

The present invention is related to U.S. Ser. No. 10/963,036 entitled "Set Retarder Compositions, Cement Compositions, and Associated Methods" filed on even date herewith, which is assigned to the assignee of the present invention, the entire disclosure of which is incorporated herein by reference.

BACKGROUND

The present invention relates to cementing operations, and more particularly, to cement compositions that comprise a copolymer retarder that comprises olefinically unsaturated non-acrylate sulfonate monomers and olefinically unsaturated carboxylic acid monomers and associated methods.

Cement compositions are commonly utilized in subterranean operations, particularly subterranean well completion and remedial operations. For example, cement compositions are used in primary cementing operations whereby pipe strings such as casings and liners are cemented in well bores. In performing primary cementing, cement compositions are pumped into the annular space between the walls of a well bore and the exterior surface of a pipe string disposed therein. The cement composition is permitted to set in the annular space, thereby forming an annular sheath of hardened substantially impermeable cement therein that supports and positions the pipe string in the well bore and bonds the exterior surface of the pipe string to the walls of the well bore. Cement compositions also are used in remedial cementing operations such as plugging highly permeable zones or fractures in well bores, plugging cracks and holes in pipe strings, and the like.

These cementing operations generally occur under a wide variety of well bore conditions, for example, ranging from shallow wells (less than about 1,000 feet) to extremely deep wells (greater than about 35,000 feet). Generally, the cement composition should remain in a pumpable state until the cement composition has been placed into the desired location. To retard the set time of the cement composition, among other things, so that the cement composition may be placed in a desired location, conventional set retarder compositions have been included therein. As used herein, the phrase "conventional set retarder compositions" refers to a wide variety of compositions commonly used in cementing operations for delaying the set time of a cement composition, including lignosulfonates, organic acids, phosphonic acid derivatives, synthetic polymers (e.g., copolymers of 2-acrylamido-2-methylpropane sulfonic acid ("AMPS") and unsaturated carboxylic acids), inorganic borate salts, and combinations thereof. As used herein, the term "copolymer" refers to a polymer comprising two or more different monomers. As bottom hole circulating temperatures ("BHCT") increase, combinations of conventional set retarder compositions have been used. For example, in well bores having a BHCT greater than about 200° F. to about 250° F., combinations of low temperature retarders, for example lignosulfonates and synthetic polymers, with co-set retarders such as organic acids and inorganic borate salts have been used. However, even such optimized combinations of conventional set retarder compositions may not provide a desired level of set retardation, for example, in wells having a bottom hole circulating temperatures ("BHCT") above about 400° F. or in the range of from about 400° F. to about 600° F. Therefore, these temperatures limit the temperatures at which a cement composition may be pumped using conventional set retarder compositions and, thus, limit the depths and associated temperatures at which well bores may be drilled and isolated with a cement composition placed in the annulus.

SUMMARY

The present invention relates to cementing operations, and more particularly, to cement compositions that comprise a copolymer retarder that comprises olefinically unsaturated non-acrylate sulfonate monomers and olefinically unsaturated carboxylic acid monomers and associated methods.

In one embodiment, the present invention provides a method of cementing in a subterranean formation penetrated by a well bore that comprises providing a cement composition that comprises water and a cement; retarding the set time of the cement composition by including a copolymer retarder in the cement composition, wherein the cement composition comprises olefinically unsaturated non-acrylate sulfonate monomers and olefinically unsaturated carboxylic acid monomers, wherein the copolymer retarder does not comprise nonionic monomers; introducing the cement composition into the subterranean formation; and allowing the cement composition to set therein.

In another embodiment, the present invention provides a method of cementing in a subterranean formation penetrated by a well bore that comprises providing a cement composition that comprises water and a cement; retarding the set time of the cement composition by including a copolymer retarder and a co-set retarder composition in the cement composition, wherein the copolymer retarder comprises olefinically unsaturated non-acrylate sulfonate monomers and olefinically unsaturated carboxylic acid monomers, wherein the co-set retarder composition consists essentially of an organic acid, a synthetic polymer, a phosphonic acid derivative, or a combination thereof; introducing the cement composition into the subterranean formation; and allowing the cement composition to set therein.

In another embodiment, the present invention provides a method of cementing in a subterranean formation penetrated by a well bore that comprises providing a cement composition that comprises water and a cement; retarding the set time of the cement composition by including a dipolymer retarder in the cement composition, wherein the dipolymer retarder comprises olefinically unsaturated non-acrylate sulfonate monomers and olefinically unsaturated carboxylic acid monomers; introducing the cement composition into the subterranean formation; and allowing the cement composition to set therein.

In another embodiment, the present invention provides a method of retarding the set time of a cement composition that comprises providing a cement composition that comprises water and a cement; and retarding the set time of the cement composition by including a copolymer retarder in the cement composition, wherein the copolymer retarder comprises olefinically unsaturated non-acrylate sulfonate monomers and olefinically unsaturated carboxylic acid monomers, wherein the copolymer retarder does not comprise nonionic monomers.

In another embodiment, the present invention provides a method of retarding the set time of a cement composition that comprises providing a cement composition that comprises water and a cement; and retarding the set time of the cement composition by including a dipolymer retarder in the cement composition, wherein the dipolymer retarder comprises olefinically unsaturated non-acrylate sulfonate monomers and olefinically unsaturated carboxylic acid monomers.

In yet another embodiment, the present invention provides a method of retarding the set time of a cement composition that comprises providing a cement composition that comprises water and a cement; and retarding the set time of the cement composition by including a copolymer retarder and a co-set retarder composition in the cement composition, wherein the copolymer retarder comprises olefinically unsaturated non-acrylate sulfonate monomers and olefinically unsaturated carboxylic acid monomers, wherein the co-set retarder composition consists essentially of an organic acid, a synthetic polymer, or a phosphonic acid derivative.

The objects, features and advantages of the present invention will be readily apparent to those skilled in the art upon a reading of the description of specific embodiments that follows.

DESCRIPTION

The present invention relates to cementing operations, and more particularly, to cement compositions that comprise a copolymer retarder that comprises olefinically unsaturated non-acrylate sulfonate ("OUS") monomers and olefinically unsaturated carboxylic acid ("OUC") monomers and associated methods.

The cement compositions of the present invention generally comprise water, a cement, and a copolymer retarder that comprises OUS monomers and OUC monomers, wherein the copolymer retarder is capable of retarding the set time of the cement composition. In some embodiments, the cement compositions of the present invention may further comprise a co-set retarder composition. Generally, the cement compositions of the present invention should be useful in cementing operations in well bores having BHCTs of up to about 700° F. In some embodiments, the cement compositions of the present invention may be used in well bores where some delay in the set time of the cement composition is desired, for example, in well bores having BHCTs of greater than about 200° F. In some embodiments, the cement compositions of the present invention may be used in well bores having BHCTs of greater than about 400° F. The inclusion of a co-set retarder composition retarder may provide desirable levels of set retardation in well bores having BHCTs above about 250° F. However, in some embodiments, depending, for example, on the concentration of the copolymer set retarder, the cement compositions may have a desirable level of set retardation in well bores having BHCTs above about 250° F. without the inclusion of a co-set retarder composition.

Generally, the cement compositions of the present invention may have a density suitable for a particular application. In some embodiments, the cement compositions of the present invention may range in density from about 5 lb/gallon ("ppg") to about 25 ppg. In one embodiment, the cement compositions of the present invention may range in density from about 10 ppg to about 23 ppg. In yet another embodiment, the cement compositions of the present invention may range in density from about 15 ppg to about 21 ppg.

Suitable water for use in the cement compositions of the present invention includes fresh water, saltwater (e.g., water containing one or more salts dissolved therein), brine (e.g., saturated saltwater), or seawater. Generally, the water may be from any source provided that it does not contain an excess of compounds that adversely affect the cement compositions. The water may be present in an amount sufficient to form a pumpable slurry. Generally, the water is present in the cement compositions of the present invention in an amount in the range of from about 20% to about 200% by weight of cement ("bwoc") therein. In certain embodiments, the water is present in the cement compositions of the present invention in an amount in the range of from about 25% to about 110% bwoc therein.

Any cements suitable for use in subterranean applications are suitable for use in the present invention. In one embodiment, the improved cement compositions of the present invention comprise a hydraulic cement. A variety of hydraulic cements are suitable for use including those comprised of calcium, aluminum, silicon, oxygen, and/or sulfur, which set and harden by reaction with water. Such hydraulic cements include, but are not limited to, Portland cements, pozzolanic cements, gypsum cements, high alumina content cements, silica cements, high alkalinity cements, and combinations thereof.

The cement compositions of the present invention should comprise a copolymer retarder that comprises OUS monomers and OUC monomers. Among other things, the copolymer retarder that comprises OUS monomers and OUC monomers should act to retard the set time of the cement composition therein. Suitable copolymers include dipolymers, terpolymers, quaterpolymers, and the like. A specific example of a suitable copolymer retarder that comprises OUS monomers and OUC monomers is a styrene sulfonic acid and maleic anhydride ("SSMA") copolymer in the acid or salt form. An example of a suitable SSMA copolymer having a styrene monomer to maleic anhydride mole ratio of about 1:1 is commercially available as "NARLEX® D-72" polymer. An example of a suitable SSMA copolymer having a styrene monomer to maleic anhydride mole ratio of about 3:1 is commercially available as "VERSA TL®-3." In some embodiments, the copolymer retarder does not contain nonionic monomers. In another embodiment, aqueous solutions of the above polymers containing up to about 50% polymer by weight are used. Further, numerous salts of the copolymer retarders may be made by methods well known in the art. As used herein, the term "copolymer" is intended to include the acid form of the copolymer as well as its various salts.

The OUS monomers suitable for use in the present invention include sulfonated monomers that do not contain base-degradable functional groups, for example, amides or esters. Examples of suitable OUS monomers include sulfonated styrene, vinyltoluenesulfonic acid, vinylnapthalenesulfonic acid, allyloxylbenzenesulfonic acid, 3-allyloxy-2-hydroxypropane sulfonic acid, and allylsulfonic acid. These monomers may used in the acid or salt form. In some embodiments, when the monomers are used in the acid form, the final copolymer may be neutralized prior to use.

As used herein, an OUC monomer is intended to include aliphatic, branched or cyclic, mono-, di-, or tri- carboxylic acids, the alkali or alkaline earth metal salts thereof, and the amides, esters, imides and anhydrides thereof. Suitable OUC monomers should be copolymerizable with an OUS monomer. Examples of suitable OUC monomers include acrylic acid, alkyl acrylic acids, for example methacrylic acid and ethacrylic acid; alpha-chloro-acrylic acid, alpha-cyano acrylic acid, alpha-chloro-methacrylic acid, alpha-cyano methacrylic acid, crotonic acid, alpha-phenyl acrylic acid, beta-acryloxy propionic acid, sorbic acid, alpha-chloro sorbic acid, angelic acid, cinnamic acid, p-chloro cinnamic acid, beta-styryl acrylic acid (1-carboxy-4-phenyl butadiene-1,3), itaconic acid, maleic acid, citraconic acid, mesaconic acid, glutaconic acid, aconitic acid, fumaric acid, and tricarboxy ethylene. Of these, maleic acid; maleimide; diesters, monoester, and amide derivatives of maleic acid; unsubstituted acrylic acid and derivatives thereof; and alkyl acrylic acid and derivatives thereof are preferred.

The ratio of the OUS monomers to the OUC monomers in the copolymer retarder may vary dependent on a number of factors, including the particular monomers chosen and the desired level set retardation. In some embodiments, the mole ratio of the OUS monomers to OUC monomers may be in the range of from about 10:1 to about 1:10. In some embodiments, the mole ratio of the OUS monomers to OUC monomers may be in the range of from about 3:1 to about 1:3. In some embodiments, the mole ratio of the OUS monomers to OUC monomers may be about 1:1.

Generally, the copolymer retarder that comprises OUS monomers and OUC monomers should be included in the cement compositions of the present invention in an amount sufficient to provide a desired level of set retardation, based on a number of factors, including the BHCT and bottom hole pressure of the well bore. In some embodiments, the quantity of the copolymer retarder to be included in the cement compositions of the present invention may be determined prior to preparation of the cement composition. For example, the quantity of the copolymer retarder to be included in the cement compositions of the present invention may be determined by performing thickening time tests of the type described in API Recommended Practices 10B, Procedure 9, Twenty-Second Edition, December 1997. In some embodiments, the copolymer retarder that comprises OUS monomers and OUC monomers is included in the cement compositions of the present invention in an amount in the range of from about 0.01% bwoc to about 1% bwoc. In some embodiments, the copolymer retarder that comprises OUS monomers and OUC monomers is included in the cement compositions of the present invention in an amount in the range of from about 0.1% bwoc to about 10% bwoc.

Co-set retarder compositions that may be included in the cement compositions of the present invention include any of a variety of conventional set retarder compositions capable of retarding the set time of the cement composition of the present invention that may be used in cementing operations. Among other things, inclusion of the co-set retarder composition in the cement compositions of the present invention may provide desirable levels of set retardation when using the cement compositions in well bores having a BHCT of greater than about 250° F. Examples of suitable co-set retarder compositions include organic acids, phosphonic acid derivatives, inorganic borate salts, synthetic polymers, and combinations thereof. Examples of suitable organic acids include tartaric acid, gluconic acid, citric acid, gluconoheptanoic acid, ethylenediamine tetra acetic acid ("EDTA"), nitrilotriacetic acid ("NTA"), combinations thereof, and the like. An example of a suitable organic acid is commercially available as "HR™-25" retarder from Halliburton Energy Services, Inc., Duncan, Okla. Another example of a suitable organic acid is available as a mixture that comprises calcium ligonsulfonate and gluconic acid in a 75:25 calcium lignosulfonate to gluconic acid and is commercially available as "HR™-12" retarder, from Halliburton Energy Services, Inc., Duncan, Okla. Suitable synthetic polymers include a wide variety of synthetic polymers that may be used as set retarder in cementing operations, including copolymers comprising an AMPS monomer and a carboxylated acrylic monomer. Examples of suitable synthetic polymers are commercially available as "SCR™-100" retarder from Halliburton Energy Services, Inc., Duncan, Okla., which is described in U.S. Pat. Nos. 4,941,536; 5,049,288; 5,472,051, the relevant disclosures of which are incorporated herein by reference, and as "SCR™-500" retarder from Halliburton Energy Services, Inc., Duncan, Okla., which is described in U.S. Pat. No. 5,536,311, the relevant disclosure of which is incorporated herein by reference. In some embodiments, the co-set retarder composition comprises inorganic borate salts. Examples of suitable inorganic borate salts includes potassium pentaborate, sodium tetraborate, borax, combinations thereof, and the like. An example of a suitable borate salt is commercially available as "COMPONENT R™" additive from Halliburton Energy Services, Inc., Duncan, Okla. An example of a suitable phosphonic acid derivative is a 25% solution in water of amino tris(methylene phosphonic acid) and is commercially available as "Micro Matrix™" cement retarder from Halliburton Energy Services, Inc., Duncan, Okla., which is described in U.S. Pat. Nos. 5,340,397 and 5,484,478, the relevant disclosures of which are incorporated herein by reference. One of ordinary skill in the art will be able to determine other the particular co-set retarder composition to use in the cement compositions of the present invention for a particular application.

The amount of a particular co-set retarder composition to include generally depends on a number of factors, including the BHCT and bottom hole pressure of the well bore, the desired set retardation, the particular co-set retarder composition chosen, the cement composition of the present invention included therein, and other factors known to those of ordinary skill in the art. In some embodiments, the quantity of the co-set retarder composition to be included in a cement composition of the present invention may be determined prior to preparation of the cement composition. For example, the quantity of a conventional set retarder composition to be included in a cement composition of the present invention may be determined by performing thickening time tests of the type described in API Recommended Practices 10B, Procedure 9, Twenty-Second Edition, December 1997. More particularly, in certain embodiments, a co-set retarder composition may be present in the cement compositions of the present invention in an amount in the range of from about 0.01% to about 10% bwoc. In some embodiments, a co-set retarder composition may be present in the cement compositions of the present invention in an amount in the range of from about 1% to about 7% bwoc.

Optionally, the cement compositions of the present invention further may comprise a dispersant. Where present, the dispersant acts, among other things, to control the rheology of the cement composition. While a variety of dispersants known to those skilled in the art may be used in accordance with the present invention, a suitable dispersant comprises a water-soluble polymer prepared by the condensation of formaldehyde with acetone and sodium bisulfite. Such a dispersant is commercially available under a "CFR™-3" dispersant from Halliburton Energy Services, Inc., Duncan, Okla. Another suitable dispersant is a sodium salt of napthalene sulfonic acid-formaldehyde condensate, an example of which is commercially available under the trade designation "CFR™-2," dispersant also from Halliburton Energy Services, Inc., Duncan, Okla. Where used, the dispersant should be present in the cement compositions of the present invention in an amount sufficient to prevent gelation of the cement composition. In some embodiments, the dispersant is present in the cement compositions of the present invention in an amount in the range of from about 0.1% to about 5% bwoc.

In some embodiments, the dispersant is present in the cement compositions of the present invention in an amount in the range of from about 0.1% to about 3% bwoc.

The cement compositions of the present invention further may comprise a strength-retrogression additive, for example, when the cement compositions may be used in well bores having a BHCT that exceeds about 230° F. As used herein, the phrase "strength-retrogression additive" refers to materials (e.g., crystalline silica) that are capable of preventing the strength retrogression of a set cement composition when exposed to high temperatures. Any suitable strength-retrogression additive suitable for use in cementing operations may be included in the cement compositions of the present invention. Examples of suitable strength-retrogression additives include crystalline silica, such as, e.g., coarse grain crystalline silica, fine grain crystalline silica, or a combination thereof. An example of a suitable fine grain crystalline silica is "SSA-1" strength stabilization agent, commercially available from Halliburton Energy Services, Inc., Duncan, Okla. An example of a suitable coarse grain crystalline silica is "SSA-2" strength stabilization agent, commercially available from Halliburton Energy Services, Inc., Duncan, Okla. Generally, a strength-retrogression additive may be included in the cement compositions of the present invention in an amount sufficient to provide the desired level of strength retrogression prevention. In some embodiments, a strength-retrogression additive may be included in the cement compositions in an amount in the range of from about 30% to about 80% bwoc. Those of ordinary skill in the art, with the benefit of this disclosure, will be able to select the appropriate type and amount of the strength regression additive to include in the cement compositions of the present invention.

As will be recognized by those skilled in the art, the cement compositions of this invention also may include additional suitable additives, such as, for example, defoamers, fibers, fluid loss control additives, weighting materials, light weight materials (e.g., hollow beads and cenospheres), elastomers, suspension aids, foaming surfactants, salts, vitrified shale, fly ash, and the like. Weighting materials may be included in the cement compositions of the present invention to provide a desired density. Examples of suitable weighting materials include iron oxides and oxides of manganese. An example of a suitable weighting material comprising oxide of manganese is commercially available as "MICRO-MAX®" from Elkem Materials, Inc., Pittsburgh, Pa. An example of a suitable weighting material comprising iron oxide is commercially available as "Hi-Dense® No. 4" cement weighting additive from Halliburton Energy Services, Inc., Duncan, Okla. One of ordinary skill in the art with the benefit of this disclosure will be able to recognize where a particular additive is suitable for a particular application.

The cement compositions of the present invention may be prepared using any suitable technique for the preparation of cement compositions. In some embodiments, the copolymer retarder comprising OUS monomers and OUC monomers may be dry blended with the cement together with other additives (e.g., the co-set retarder composition, strength regression additives, dispersants, and the like) prior to the addition of the mix water. In other embodiments, the copolymer retarder comprising OUS monomers and OUC monomers may be added to the mix water used to make the cement composition. In other embodiments, an aqueous solution of the copolymer retarders may be added to mix water prior to addition of cement included in the cement composition. In yet other embodiments, the copolymer retarder comprising OUS monomers and OUC monomers may be dry blended with the strength regression additive (where present) and then combined with the cement using any suitable technique. One of ordinary skill in the art, with the benefit of this disclosure, will be able to prepare a cement composition suitable for use in a particular application.

An example of a suitable cement composition of the present invention is a dry blend of Class H cement (94 lbs/sack), fine grain silica (SSA-1, 10% bwoc), coarse grain silica (SSA-2, 30% bwoc), an iron oxide weighting material (Hi-Dense® No. 4, 61.1 lbs/sack), sodium chloride (18% by weight of water), a dispersant that is a sulfite adduct of acetone-formaldehyde condensate (CFR™-3, 1.0% bwoc), a gas migration prevention polymer additive (Gasstop™ HT, 0.8% bwoc), a cement flow enhancer (EZ-FLO™, 0.07% bwoc), a copolymer retarder of the present invention (NARLEX® D-72, 5% bwoc), an organic acid co-set retarder composition (HR™-25, 5% bwoc) that is added to tap water (5.95 gal/sack) to obtain a 19 ppg cement slurry that may be retarded sufficiently to be useful at well temperatures of about 575° F.

To facilitate a better understanding of the present invention, the following illustrative examples of some of the certain embodiments are given. In no way should such examples be read to limit, or define, the scope of the invention.

EXAMPLE 1

Sample compositions were prepared according to the following procedure. Each sample was dry blended, then blended with water for 15 seconds at 4,000 rpm in a Waring Blendor, and then mixed for 35 seconds at 12,000 rpm in the Waring blender. After sample preparation, thickening time tests were performed on each of the samples using a High-Temperature/High-Pressure consistometer according to API Recommended Practices 10B, Procedure 9, Twenty-Second Edition, December 1997. While the thickening time test was being performed, each sample composition was brought up to 575° F. and 32,000 psi, unless otherwise noted, in the time listed in the tables below.

Sample No. 1 (comparative) was prepared as described above by adding Class H Cement (94 lbs/sack), coarse grain crystalline silica (SSA-2, 35% bwoc), and a weighting material (Hi-Dense® No. 4, 68.8 lbs/sack) to tap water (6 gal/sack). HR®-25 retarder (6% bwoc) and potassium pentaborate (COMPONENT R™, 6% bwoc) were further included in Sample No. 1 to retard the set time thereof.

Sample No. 2 (comparative) was prepared as described above by adding Class H Cement (94 lbs/sack), coarse grain crystalline silica (SSA-2, 40% bwoc), a weighting material (Hi-Dense® No. 4, 70 lbs/sack), a fluid loss control additive (Diacel® LWL, 1% bwoc), a gas migration prevention polymer additive (Gasstop™ HT, 0.8% bwoc), and a cement flow enhancer (EZ-FLO™, 0.07% bwoc) to tap water (6 gal/sack). Gasstop™ HT cement additive is a gas migration prevention polymer additive that is commercially available from Halliburton Energy Services, Duncan, Okla. EZ-FLO™ cement additive is a flow enhancer that is commercially available from Halliburton Energy Services, Duncan, Okla. Diacel® LWL Cement Fluid-Loss/Retarder Additive is a bi-functional additive that may be effective as both a fluid loss control additive and a set retarder composition. It should not be effective as a retarder at high temperatures. It is commercially available from Chevron Philips Chemical Company LP, The Woodlands, Tex. HR®-25 retarder (6% bwoc) and potassium pentaborate (COMPONENT R™, 3% bwoc) were further included in Sample No. 2 to retard the set time thereof.

Sample No. 3 (comparative) was prepared as described above by adding Class H Cement (94 lbs/sack) to tap water (4.15 gal/sack). HR®-25 retarder (6% bwoc) and potassium pentaborate (COMPONENT R™, 6% bwoc) were further included in Sample No. 3 to retard the set time thereof.

Sample No. 4 (comparative) was prepared as described above by adding Class H Cement (94 lbs/sack), fine grain crystalline silica (SSA-1, 10% bwoc), coarse grain crystalline silica (SSA-2, 30% bwoc), sodium chloride (18% bwow), a weighting material (MicroMax®, 75 lbs/sack), a gas migration prevention polymer additive (Gasstop™ HT, 0.8% bwoc), and a cement flow enhancer (EZ-FLO™, 0.07% bwoc) to tap water (6.51 gal/sack). HR®-25 retarder (5% bwoc) and SCR™-500 (5% bwoc) were further included in Sample No. 4 to retard the set time thereof.

Sample No. 5 (comparative) was the same as Sample No. 4 except that the weighting material was increased to 80 lb/sack, the sodium chloride was increased to 55% by weight of water, and the tap water was increased to 6.79 gal/sack.

For each of Sample Nos. 1–5, a summary of the composition and thickening times at 575° F. are provided in Table 1.

TABLE 1

| FLUID | Sample No. 1 | Sample No. 2 | Sample No. 3 | Sample No. 4 | Sample No. 5 |
| --- | --- | --- | --- | --- | --- |
| % SCR-500 ™ bwoc | 0 | 0 | 0 | 5 | 5 |
| % HR ®-12 bwoc | 6 | 6 | 6 | 0 | 0 |
| % HR ®-25 bwoc | 0 | 0 | 0 | 5 | 5 |
| % Potassium Pentaborate bwoc | 6 | 3 | 6 | 0 | 0 |
| Water (gal/sack) | 6 | 6 | 4.15 | 6.51 | 6.79 |
| Density (lb/gal) | 19 | 19 | 16.2 | 19 | 19 |
| Yield (ft³/sack) | 1.79 | 1.84 | 1.15 | 1.98 | 2.18 |
| Minutes to heat to 575° F. | 90 | 90 | 90 | 90 | 90 |
| Thickening Time (hr:min) at 575° F. | 1:45 | 1:08 | 1:19 | 1:55 | 1:10 |

Sample No. 6 (comparative) was the same as Sample No. 4 except that the weighting material was increased to 80 lb/sack, the sodium chloride was increased to 50% by weight of water, and the tap water was increased to 6.79 gal/sack.

Sample No. 7 (comparative) was the same as Sample No. 4 except that Hi-Dense® No. 4 was used as the weighting material in an amount of 65 lb/sack instead of MicroMax and the tap water was decreased to 6.16 gal/sack.

Sample No. 8 (comparative) was prepared as described above by adding Class H Cement (94 lbs/sack), coarse grain crystalline silica (SSA-2, 50% bwoc), sodium chloride (18% by weight of water), a weighting material (MicroMax, 100 lbs/sack), and a cement flow enhancer (EZ-FLO™, 0.07% bwoc) to tap water (6.51 gal/sack). SCR-500™ retarder (5% bwoc) and borax (5% bwoc) were further included in Sample No. 8 to retard the set time thereof.

Sample No. 9 (comparative) was prepared as described above by adding Class H Cement (94 lbs/sack), fine grain crystalline silica (SSA-1, 10% bwoc), coarse grain crystalline silica (SSA-2, 30% bwoc), sodium chloride (18% by weight of water), a weighting material (MicroMax®, 35 lbs/sack), a gas migration prevention polymer additive (Gasstop™ HT, 0.8% bwoc), and a cement flow enhancer (EZ-FLO™, 0.07% bwoc) to tap water (6.51 gal/sack). SCR-500™ retarder (3% bwoc) was further included in Sample No. 9 to retard the set time thereof.

Sample No. 10 (comparative) was the same as Sample No. 9 except that the tap water was decreased to 2.85 gal/sack and the sample further contained Micro Matrix™ cement retarder in an amount of 2 gal/sack to retard the set time thereof.

For each of Sample Nos. 6–10, a summary of the composition and thickening times at to 575° F. are provided in Table 2. Sample Nos. 6–10 are comparative cement compositions that comprise a conventional set retarder composition.

TABLE 2

| FLUID | Sample No. 6 | Sample No. 7 | Sample No. 8 | Sample No. 9 | Sample No. 10 |
| --- | --- | --- | --- | --- | --- |
| % SCR-500 ™ bwoc | 5 | 5 | 5 | 3 | 3 |
| % HR ®-25 bwoc | 5 | 5 | 0 | 0 | 0 |
| % Borax bwoc | 0 | 0 | 5 | 0 | 0 |
| Micro Matrix ™ Cement Retarder (gal/sack) | 0 | 0 | 0 | 0 | 2 |
| Water (gal/sack) | 6.79 | 6.16 | 7.57 | 4.67 | 2.85 |
| Density (lb/gal) | 19 | 19 | 19 | 19 | 19 |
| Yield (ft³/sack) | 2.18 | 1.88 | 2.35 | 1.52 | 1.25 |
| Minutes to heat to 575° F. | 90 | 90 | 100 | 90 | 90 |
| Thickening Time (hr:min) at 575° F. | 1:00 | 1:55 | 2:00 | 1:47 | 3:12[1] |

[1]The thickening time test for Sample No. 12 was performed at 22,500 psi.

Sample No. 11 (comparative) was the same as Sample No. 9 except that the amount of the weighting material was increased to 60 lb/sack, the tap water was decreased to 4.06 gal/sack, the sample further contained Micro Matrix™ cement retarder in an amount of 2 gal/sack and potassium pentaborate (COMPONENT R™) in an amount of 3% bwoc to retard the set time thereof.

Sample No. 12 (comparative) was the same as Sample No. 9 except that the tap water was decreased to 4.57 gal/sack, the SCR-500™ was increased to 5% bwoc, and the sample further contained a fluid loss control additive (HALAD®-413, 0.4% bwoc). HALAD®-413 additive is a fluid loss control additive that is commercially available from Halliburton Energy Services, Inc., Duncan, Okla.

Sample No. 13 (comparative) was the same as Sample No. 9 except that the amount of the weighting material was increased to 80 lb/sack, the sodium chloride was increased to 55% by weight of water, and the tap water was increased to 5.7 gal/sack. Further, Sample No. 13 did not contain SCR™-500 retarder. Even further, Sample No. 13 contained DEQUEST® 2066A in an amount of 2% bwoc. DEQUEST® 2066A, a tris(methylene phosphonic acid) sodium salt, is commercially available from Solutia, Inc., St. Louis, Mo.

Sample No. 14 (comparative) was the same as Sample No. 9 except that the amount of the fine grain crystalline silica was increased to 25% bwoc, the coarse grain crystalline silica was decreased to 15% bwoc, the weighting material was decreased to 20 lbs/sack, the SCR™-500 retarder was decreased to 2.5% bwoc, and the tap water was increased to 5.03 gal/sack.

For each of Sample Nos. 11–14, a summary of the composition and thickening times at 575° F. are provided in Table 3.

TABLE 3

| FLUID | Sample No. 11 | Sample No. 12 | Sample No. 13 | Sample No. 14 |
|---|---|---|---|---|
| % SCR ™-500 bwoc | 3 | 5 | 0 | 2.5 |
| % HR ®-25 bwoc | 0 | 0 | 5 | 0 |
| % COMPONENT R ™ bwoc | 3 | 0 | 0 | 0 |
| Micro Matrix ™ Cement Retarder (gal/sack)[2] | 2 | 0 | 0 | 0 |
| Water (gal/sack) | 4.06 | 4.57 | 5.7 | 5.03 |
| Density (lb/gal) | 19 | 19 | 19 | 18 |
| Yield (ft³/sack) | 1.81 | 1.53 | 2.26 | 1.52 |
| Minutes to heat to 575° F. | 90 | 90 | 90 | 90 |
| Thickening Time (hr:min) at 575° F. | 1:40 | 1:47 | 0:35 | 1:33 |

Sample No. 15 was prepared as described above by adding Class H Cement (94 lbs/sack), fine grain crystalline silica (SSA-1, 10%, bwoc), coarse grain crystalline silica (SSA-2, 30% bwoc), a weighting material (Hi-Dense® No. 4, 61.1 lbs/sack), sodium chloride (18% by weight of water), an unweighed amount of a dispersant (CFR™-3) to obtain good mixability, a gas migration prevention polymer additive (Gasstop™ HT, 0.8% bwoc), and a cement flow enhancer (EZ-FLO™, 0.07% bwoc) to tap water (5.95 gal/sack). NARLEX® D-72 polymer (5% bwoc) and HR®-25 retarder (5% bwoc) were further included in Sample No. 15 to retard the set time thereof.

Sample No. 16 was the same as Sample No. 15 except that the dispersant (CFR-3™) was included in an amount of 1% bwoc and the tap water was reduced to 5.88 gal/sack.

Sample No. 17 was the same as Sample No. 15 except that the weighting material was increased to 65 lbs/sack, no dispersant was included, the tap water was increased to 6.15 gal/sack, and the gas migration prevention polymer additive and HR®-25 retarder were not included.

Sample No. 18 was the same as Sample No. 15 except that the weighting material was increased to 65 lbs/sack, no dispersant was included, the tap water was increased to 6.01 gal/sack, the gas migration prevention polymer additive and HR®-25 retarder were not included, and potassium pentaborate (COMPONENT R™, 5% bwoc) was included.

For each of Sample Nos. 15–18, a summary of the composition and thickening times at 575° F. are provided in Table 4.

TABLE 4

| FLUID | Sample No. 15 | Sample No. 15[1] | Sample No. 16 | Sample No. 17 | Sample No. 18 |
|---|---|---|---|---|---|
| % SCR-100 ™ bwoc | 0 | 0 | 0 | 0 | 0 |
| % SCR-500 ™ bwoc | 0 | 0 | 0 | 0 | 0 |
| % Narlex ® D-72 bwoc | 5 | 5 | 5 | 5 | 5 |
| % HR ®-25 bwoc | 5 | 5 | 5 | 0 | 0 |
| % COMPONENT R ™ bwoc | 0 | 0 | 0 | 0 | 5 |
| Water (gal/sack) | 5.95 | 5.95 | 5.88 | 6.15 | 6.01 |
| Density (lb/gal) | 19 | 19 | 19 | 19 | 19 |
| Yield (ft³/sack) | 1.84 | 1.84 | 1.84 | 1.81 | 1.84 |
| Minutes to heat to 575° F. | 100 | 100 | 100 | 90 | 90 |
| Thickening Time (hr:min) at 575° F. | 5:40+[2] | 4:30 | 5:01 | 2:20 | 3:05 |

[1] The amount of CFR ™-3 dispersant included was slightly less than the previous test of Sample No. 15.
[2] The test was terminated at 5:40 and there was no indication of setting at that time.

Sample No. 19 was the same as Sample No. 15 except that the weighting material was increased to 65 lbs/sack, no dispersant was included, the tap water was decreased to 5.9 gal/sack, the gas migration prevention polymer additive and HR®-25 retarder were not included, and the amount of NARLEX® D-72 polymer was increased to 10% bwoc.

Sample No. 20 was the same as Sample No. 15 except that the weighting material was increased to 65 lbs/sack, the dispersant was included in an amount of 3% bwoc, the tap water was decreased to 5.93 gal/sack, the gas migration prevention polymer additive was not included, and the amount of NARLEX® D-72 polymer was decreased to 1.75% bwoc.

Sample No. 21 was the same as Sample No. 15 except that the weighting material was increased to 65 lbs/sack, the dispersant was included in an amount of 1.5% bwoc, the tap water was decreased to 5.91 gal/sack, and the gas migration prevention polymer additive was not included.

Sample No. 22 was the same as Sample No. 15 except that the weighting material was increased to 65 lbs/sack, the dispersant was included in an amount of 2.0% bwoc, the tap water was decreased to 5.87 gal/sack, the gas migration prevention polymer additive was not included, NARLEX® D-72 polymer was not included, and VERSA TL®-3 was included in an amount of 5% bwoc.

For each of Sample Nos. 19–22, a summary of the composition and thickening times at 575° F. are provided in Table 5.

TABLE 5

| FLUID | Sample No. 19 | Sample No. 20 | Sample No. 21 | Sample No. 22 |
|---|---|---|---|---|
| % Narlex ® D-72 bwoc | 10 | 1.75 | 5 | 0 |
| % VERSA TL ®-3 bwoc | 0 | 0 | 0 | 5 |
| % HR ®-25 bwoc | 0 | 5 | 5 | 5 |
| Water (gal/sack) | 5.9 | 5.93 | 5.91 | 5.87 |
| Density (lb/gal) | 19 | 19 | 19 | 19 |
| Yield (ft³/sack) | 1.83 | 1.84 | 1.84 | 1.84 |
| Minutes to heat to 575° F. | 90 | 90 | 90 | 90 |
| Thickening Time (hr:min) at 575° F. | 3:36 | 1:35 | 4:41 | 1:19 |

Further, Sample Nos. 23–26 also were prepared. These samples further included NTA or EDTA to retard the set time thereof.

Sample No. 23 was the same as Sample No. 15 except that the weighting material was increased to 65 lbs/sack, the dispersant was included in an amount of 4% bwoc, the tap water was increased to 6.03 gal/sack, the gas migration prevention polymer additive was not included, EDTA was included in an amount of 1% bwoc, and the amount of NARLEX® D-72 polymer was decreased to 4% bwoc.

Sample No. 24 was the same as Sample No. 15 except that the weighting material was increased to 65 lbs/sack, no dispersant was included, the tap water was increased to 6.08 gal/sack, the gas migration prevention polymer additive was not included, NTA was included in an amount of 1% bwoc, and the amount of NARLEX® D-72 polymer was decreased to 4% bwoc.

Sample No. 25 was the same as Sample No. 15 except that the weighting material was increased to 65 lbs/sack, no dispersant was included, the tap water was increased to 6.22 gal/sack, the gas migration prevention polymer additive was not included, and EDTA was included in an amount of 5% bwoc.

Sample No. 26 was the same as Sample No. 15 except that the weighting material was increased to 65 lbs/sack, no dispersant was included, the tap water was decreased to 6.09 gal/sack, the gas migration prevention polymer additive was not included, and EDTA was included in an amount of 5% bwoc.

For each of Sample Nos. 23–26, a summary of the composition and thickening times at 575° F. are provided in Table 6.

TABLE 6

| FLUID | Sample No. 23 | Sample No. 24 | Sample No. 25 | Sample No. 26 |
|---|---|---|---|---|
| % Narlex ® D-72 bwoc | 4 | 4 | 5 | 5 |
| % HR ®-25 bwoc | 5 | 5 | 0 | 5 |
| % EDTA bwoc | 1 | 0 | 5 | 5 |
| % NTA bwoc | 0 | 1 | 0 | 0 |
| Water (gal/sack) | 6.03 | 6.08 | 6.22 | 6.09 |
| Density (lb/gal) | 19 | 19 | 19 | 19 |
| Yield (ft³/sack) | 1.84 | 1.84 | 1.85 | 1.88 |
| Minutes to heat to 575° F. | 100 | 90 | 90 | 90 |
| Thickening Time (hr:min) at 575° F. | 4:00 | 3:25 | 2:24 | 3:01 |

Therefore, Example No. 1 indicates, among other things, that the use of cement compositions of the present invention that comprise water, a cement, and a copolymer retarder that comprises OUC monomers and OUS monomers may provide a desirable level of set retardation.

EXAMPLE 2

Samples were prepared according to the following procedure. Each sample was dry blended, then blended with water for 15 seconds at 4,000 rpm in a Waring Blendor, and then mixed for 35 seconds at 12,000 rpm in the Waring Blendor. Each sample comprised Capitol H cement, fresh water (5.25 gal/sack), coarse grain crystalline silica (SSA-2, 35% bwoc), and a fluid loss control additive (Halad®-344, 0.5% bwoc). In additional each sample further comprised set retarder compositions to retard the set time as indicated in Tables 7 and 8. After sample preparation, thickening time tests were performed on each of the samples according to API Recommended Practices 10B, Procedure 9, Twenty-Second Edition, December 1997. Thickening time tests were performed on each sample at the temperatures listed in Tables 7–8.

For each of Sample Nos. 27–30, a summary of the composition and thickening times are provided in Table 7. Sample Nos. 27 and 28 were comparative cement compositions that comprised SCR-100™ or SCR-500™. Samples Nos. 29 and Nos. 30 were cement compositions of the present invention that comprised an above-described copolymer retarder (e.g., Narlex® D-72 or VERSA TL®-3) and an optional co-set retarder composition.

TABLE 7

| FLUID | Sample No. 27 | Sample No. 28 | Sample No. 29 | Sample No. 30 |
|---|---|---|---|---|
| % SCR ™-100 bwoc | 0.3 | 0 | 0 | 0 |
| % SCR ™-500 bwoc | 0 | 0.3 | 0 | 5 |
| % Narlex ® D-72 bwoc | 0 | 0 | 0.3 | 0 |
| % VERSA TL ®-3 bwoc | 0 | 0 | 0 | 0.3 |
| Density (lb/gal) | 16.5 | 16.5 | 16.5 | 16.5 |
| Thickening Time (hr:min) @ 217° F. | Not Obtained | Not Obtained | 4:15 | Not Obtained |

TABLE 7-continued

| FLUID | Sample No. 27 | Sample No. 28 | Sample No. 29 | Sample No. 30 |
|---|---|---|---|---|
| Thickening Time (hr:min) @ 250° F. | 4:10 | 6:53 | 3:40 | 3:10 |

¹Halad ®-344 additive is a fluid loss control additive that is commercially available from Halliburton Energy Services, Inc., Duncan, Oklahoma.

Further Sample Nos. 31–34 were prepared in accordance with the above procedure and included greater amounts of the set retarder compositions than included in Sample Nos. 27–30, as indicated in Table 8 below. For each of Sample Nos. 31–34, a summary of the composition and thickening times are provided in Table 8. Sample Nos. 31 and 33 were comparative cement compositions that comprised SCR-500™. Samples Nos. 32 and Nos. 34 were cement compositions of the present invention that comprised an above-described copolymer set retarder (e.g., Narlex® D-72).

TABLE 8

| FLUID | Sample No. 31 | Sample No. 32 | Sample No. 33 | Sample No. 34 |
|---|---|---|---|---|
| Fresh Water (gal/sack) | 5.25 | 5.25 | 5.25 | 5.25 |
| % Capitol H Cement bwoc | 100 | 100 | 100 | 100 |
| % SSA-2 bwoc | 35 | 35 | 35 | 35 |
| % Halad ®-344 | 0.5 | 0.5 | 0.5 | 0.5 |
| % Narlex ® D-72 bwoc | 0 | 0.5 | 0 | 1.0 |
| % SCR ™-500 bwoc | 0.5 | 0 | 1.0 | 0 |
| Density (lb/gal) | 16.5 | 16.5 | 16.5 | 16.5 |
| Thickening Time (hr:min) @ 217° F. | 8:00 | 13:15 | Not Obtained | 16:00+ |
| Thickening Time (hr:min) @ 250° F. | 1:40 | 8:40 | 2:27 | 16:00+ |
| Thickening Time (hr:min) @ 350° | Not Obtained | 1:40 | Not Obtained | 16:00+ |

Therefore, Example No. 2 indicates, among other things, that the use of cement compositions of the present invention that comprise water, a cement, and a copolymer retarder that comprises OUC monomers and OUS monomers may provide a desirable level of set retardation.

Therefore, the present invention is well adapted to carry out the objects and attain the ends and advantages mentioned as well as those that are inherent therein. While numerous changes may be made by those skilled in the art, such changes are encompassed within the spirit of this invention as defined by the appended claims.

What is claimed is:

1. A method of cementing in a subterranean formation penetrated by a well bore comprising:
   providing a cement composition that comprises water and a cement;
   retarding the set time of the cement composition by including a copolymer retarder in the cement composition, wherein the copolymer retarder comprises olefinically unsaturated non-acrylate sulfonate monomers and olefinically unsaturated carboxylic acid monomers, wherein the copolymer retarder does not comprise nonionic monomers;
   introducing the cement composition into the subterranean formation; and
   allowing the cement composition to set therein.

2. The method of claim 1 wherein the well bore has a bottom hole circulating temperature of greater than about 250° F.

3. The method of claim 1 wherein the well bore has a bottom hole circulating temperature of greater than about 400° F.

4. The method of claim 1 wherein the water is present in the cement composition in an amount in the range of from about 20% to about 200% by weight of the cement.

5. The method of claim 1 wherein the cement composition has a density in the range of from about 5 pounds per gallon to about 25 pounds per gallon.

6. The method of claim 1 wherein the cement comprises a Portland cement, a pozzolanic cement, a gypsum cement, a high alumina content cement, a silica cement, a high alkalinity cement, or a combination thereof.

7. The method of claim 1 wherein the copolymer retarder is added to the cement composition prior the addition of the water or the copolymer retarder is added to the cement composition prior to the addition of the cement.

8. The method of claim 1 wherein the copolymer retarder is a dipolymer, a terpolymer, or a quaterpolymer.

9. The method of claim 1 wherein the copolymer retarder is a styrene sulfonic acid and maleic anhydride copolymer.

10. The method of claim 9 wherein the copolymer retarder has a mole ratio of a styrene monomer to maleic anhydride mole ratio of about 1:1.

11. The method of claim 1 wherein the olefinically unsaturated non-acrylate sulfonate monomers comprises a sulfonated styrene, a vinyltoluenesulfonic acid, a vinyl-napthalenesulfonic acid, an allyloxylbenzenesulfonic acid, a 3-allyloxy-2-hydroxypropane sulfonic acid, and/or an allyl-sulfonic acid.

12. The method of claim 1 wherein olefinically unsaturated carboxylic acid monomers comprise an acrylic acid, a methacrylic acid, an ethacrylic acid, an alpha-chloro-acrylic acid, an alpha-cyano acrylic acid, an alpha-chloro-methacrylic acid, an alpha-cyano methacrylic acid, a crotonic acid, an alpha-phenyl acrylic acid, a beta-acryloxy propionic acid, a sorbic acid, an alpha-chloro sorbic acid, an angelic acid, a cinnamic acid, a p-chloro cinnamic acid, a beta-styryl acrylic acid, an itaconic acid, a citraconic acid, a mesaconic acid, a glutaconic acid, an aconitic acid, a fumaric acid, or a tricarboxy ethylene.

13. The method of claim 1 wherein the olefinically unsaturated carboxylic acid monomers comprise a maleic acid, a maleimide, a diester of maleic acid, a monoester of maleic acid, an amide derivative of maleic acid, an unsubstituted acrylic acid, an alkly acrylic acid, or a derivative thereof.

14. The method of claim 1 wherein the mole ratio of the olefinically unsaturated non-acrylate sulfonate monomers to the olefinically unsaturated carboxylic acid monomers is in the range of from about 10:1 to about 1:10.

15. The method of claim 1 wherein the mole ratio of the olefinically unsaturated non-acrylate sulfonate monomers to the olefinically unsaturated carboxylic acid monomers is in the range of from about 3:1 to about 1:3.

16. The method of claim 1 wherein the copolymer retarder is present in the cement composition in an amount in the range of from about 0.01% to about 15% by weight of the cement.

17. The method of claim 1 wherein the copolymer retarder is present in the cement composition in an amount in the range of from about 0.1% to about 10% by weight of the cement.

18. The method of claim 1 wherein retarding the set time of the cement composition further comprises including a co-set retarder composition to the cement composition.

19. The method of claim 18 wherein the co-set retarder composition comprises an organic acid, a phosphonic acid derivative, an inorganic borate salt, a synthetic polymer, or a combination thereof.

20. The method of claim 18 wherein the co-set retarder composition comprises a tartaric acid, a gluconic acid, a citric acid, a gluconoheptanoic acid, an ethylenediamine tetra acetic acid, a nitrilotriacetic acid, or a combination thereof.

21. The method of claim 18 wherein the co-set retarder composition is present in the cement composition in an amount in the range of from about 0.01% to about 10% by weight of the cement.

22. The method of claim 1 wherein the cement composition further comprises a dispersant.

23. The method of claim 1 wherein the cement composition further comprises a strength-retrogression additive.

24. The method of claim 1 wherein the cement composition further comprises a defoamer, a fiber, a fluid loss control additive, a weighting material, a light weight material, an elastomer, a suspension aid, a foaming surfactant, a salt, a vitrified shale, or a fly ash.

25. The method of claim 1 wherein retarding the set time of the cement composition further comprises including ethylenediamine tetra acetic acid and/or nitrilotriacetic acid in the cement composition.

26. A method of cementing in a subterranean formation penetrated by a well bore comprising:
providing a cement composition that comprises water and a cement;
retarding the set time of the cement composition by including a copolymer retarder and a co-set retarder composition in the cement composition, wherein the copolymer retarder comprises olefinically unsaturated non-acrylate sulfonate monomers and olefinically unsaturated carboxylic acid monomers, wherein the co-set retarder composition consists essentially of an organic acid, a synthetic polymer, a phosphonic acid derivative, or a combination thereof;
introducing the cement composition into the subterranean formation; and
allowing the cement composition to set therein.

27. The method of claim 26 wherein the well bore has a bottom hole circulating temperature of greater than about 250° F.

28. The method of claim 26 wherein the well bore has a bottom hole circulating temperature of greater than about 400° F.

29. The method of claim 26 wherein the copolymer retarder and/or the co-set retarder composition is added to the cement composition prior the addition of the water or subsequent to the addition of water to the cement composition.

30. The method of claim 26 wherein the copolymer retarder is a dipolymer, a terpolymer, or a quaterpolymer.

31. The method of claim 26 wherein the copolymer retarder is a styrene sulfonic acid and maleic anhydride copolymer.

32. The method of claim 26 wherein the olefinically unsaturated non-acrylate sulfonate monomers comprises a sulfonated styrene, a vinyltoluenesulfonic acid, a vinyl-napthalenesulfonic acid, an allyloxylbenzenesulfonic acid, a 3-allyloxy-2-hydroxypropane sulfonic acid, and/or an allyl-sulfonic acid.

33. The method of claim 26 wherein olefinically unsaturated carboxylic acid monomers comprise an acrylic acid, a methacrylic acid, an ethacrylic acid, an alpha-chloroacrylic acid, an alpha-cyano acrylic acid, an alpha-chloromethacrylic acid, an alpha-cyano methacrylic acid, a crotonic acid, an alpha-phenyl acrylic acid, a beta-acryloxy propionic acid, a sorbic acid, an alpha-chloro sorbic acid, an angelic acid, a cinnamic acid, a p-chloro cinnamic acid, a beta-styryl acrylic acid, an itaconic acid, a citraconic acid, a mesaconic acid, a glutaconic acid, an aconitic acid, a fumaric acid, or a tricarboxy ethylene.

34. The method of claim 26 wherein the olefinically unsaturated carboxylic acid monomers comprise a maleic acid, a maleimide, a diester of maleic acid, a monoester of maleic acid, an amide derivative of maleic acid, an unsubstituted acrylic acid, an alkly acrylic acid, or a derivative thereof.

35. The method of claim 26 wherein the mole ratio of the olefinically unsaturated non-acrylate sulfonate monomers to the olefinically unsaturated carboxylic acid monomers is in the range of from about 10:1 to about 1:10.

36. The method of claim 26 wherein the mole ratio of the olefinically unsaturated non-acrylate sulfonate monomers to the olefinically unsaturated carboxylic acid monomers is in the range of from about 3:1 to about 1:3.

37. The method of claim 26 wherein the copolymer retarder is present in the cement composition in an amount in the range of from about 0.01% to about 15% by weight of the cement.

38. The method of claim 26 wherein the organic acid comprises a tartaric acid, a gluconic acid, a citric acid, a gluconoheptanoic acid, an ethylenediamine tetra acetic acid, a nitrilotriacetic acid, or a combination thereof.

39. The method of claim 26 wherein the co-set retarder composition is present in the cement composition in an amount in the range of from about 0.01% to about 10% by weight of the cement.

40. The method of claim 26 wherein the cement composition further comprises a dispersant.

41. The method of claim 26 wherein the cement composition further comprises a strength-retrogression additive.

42. A method of cementing in a subterranean formation penetrated by a well bore comprising:
providing a cement composition that comprises water and a cement;
retarding the set time of the cement composition by including a dipolymer retarder in the cement composition, wherein the dipolymer retarder comprises olefinically unsaturated non-acrylate sulfonate monomers and olefinically unsaturated carboxylic acid monomers;
introducing the cement composition into the subterranean formation; and
allowing the cement composition to set therein.

43. The method of claim 42 wherein the well bore has a bottom hole circulating temperature of greater than about 250° F.

44. The method of claim 42 wherein the well bore has a bottom hole circulating temperature of greater than about 400° F.

45. The method of claim 42 wherein the dipolymer retarder is added to the cement composition prior the addition of the water or subsequent to the addition of water to the cement composition.

46. The method of claim 42 wherein the dipolymer retarder is a styrene sulfonic acid and maleic anhydride copolymer.

47. The method of claim 42 wherein the olefinically unsaturated non-acrylate sulfonate monomers comprises a sulfonated styrene, a vinyltoluenesulfonic acid, a vinylnapthalenesulfonic acid, an allyloxylbenzenesulfonic acid, a 3-allyloxy-2-hydroxypropane sulfonic acid, and/or an allylsulfonic acid.

48. The method of claim 42 wherein olefinically unsaturated carboxylic acid monomers comprise an acrylic acid, a methacrylic acid, an ethacrylic acid, an alpha-chloroacrylic acid, an alpha-cyano acrylic acid, an alpha-chloromethacrylic acid, an alpha-cyano methacrylic acid, a crotonic acid, an alpha-phenyl acrylic acid, a beta-acryloxy propionic acid, a sorbic acid, an alpha-chloro sorbic acid, an angelic acid, a cinnamic acid, a p-chloro cinnamic acid, a beta-styryl acrylic acid, an itaconic acid, a citraconic acid, a mesaconic acid, a glutaconic acid, an aconitic acid, a fumaric acid, or a tricarboxy ethylene.

49. The method of claim 42 wherein the olefinically unsaturated carboxylic acid monomers comprise a maleic acid, a maleimide, a diester of maleic acid, a monoester of maleic acid, an amide derivative of maleic acid, an unsubstituted acrylic acid, an alkly acrylic acid, or a derivative thereof.

50. The method of claim 42 wherein the mole ratio of the olefinically unsaturated non-acrylate sulfonate monomers to the olefinically unsaturated carboxylic acid monomers is in the range of from about 10:1 to about 1:10.

51. The method of claim 42 wherein the mole ratio of the olefinically unsaturated non-acrylate sulfonate monomers to the olefinically unsaturated carboxylic acid monomers is in the range of from about 3:1 to about 1:3.

52. The method of claim 42 wherein the dipolymer retarder is present in the cement composition in an amount in the range of from about 0.01% to about 15% by weight of the cement.

53. The method of claim 42 wherein retarding the cement composition further comprises including a co-set retarder composition in the cement composition.

54. The method of claim 53 wherein the co-set retarder composition comprises an organic acid, a phosphonic acid derivative, an inorganic borate salt, a synthetic polymer, or a combination thereof.

55. The method of claim 53 wherein the co-set retarder composition comprises a tartaric acid, a gluconic acid, a citric acid, a gluconoheptanoic acid, an ethylenediamine tetra acetic acid, a nitrilotriacetic acid, or a combination thereof.

56. The method of claim 53 wherein the co-set retarder composition is present in the cement composition in an amount in the range of from about 0.01% to about 10% by weight of the cement.

57. The method of claim 42 wherein the cement composition further comprises a dispersant.

58. The method of claim 42 wherein the cement composition further comprises a strength-retrogression additive.

59. The method of claim 42 wherein retarding the set time of the cement composition further comprises including ethylenediamine tetra acetic acid and/or nitrilotriacetic acid in the cement composition.

60. A method of retarding the set time of a cement composition comprising:
providing a cement composition that comprises water and a cement; and
retarding the set time of the cement composition by including a copolymer retarder in the cement composition, wherein the copolymer retarder comprises olefinically unsaturated non-acrylate sulfonate monomers and olefinically unsaturated carboxylic acid monomers, in the cement composition, wherein the copolymer retarder does not comprise nonionic monomers.

61. The method of claim 60 wherein the copolymer retarder is added to the cement composition prior the addition of the water or subsequent to the addition of water to the cement composition.

62. The method of claim 60 wherein the copolymer retarder is a styrene sulfonic acid and maleic anhydride copolymer.

63. The method of claim 60 wherein the olefinically unsaturated non-acrylate sulfonate monomers comprise a sulfonated styrene, a vinyltoluenesulfonic acid, a vinyl-napthalenesulfonic acid, an allyloxylbenzenesulfonic acid, a 3-allyloxy-2-hydroxypropane sulfonic acid, and/or an allylsulfonic acid.

64. The method of claim 60 wherein the olefinically unsaturated carboxylic acid monomers comprise an acrylic acid, a methacrylic acid, an ethacrylic acid, an alpha-chloro-acrylic acid, an alpha-cyano acrylic acid, an alpha-chloro-methacrylic acid, an alpha-cyano methacrylic acid, a crotonic acid, an alpha-phenyl acrylic acid, a beta-acryloxy propionic acid, a sorbic acid, an alpha-chloro sorbic acid, an angelic acid, a cinnamic acid, a p-chloro cinnamic acid, a beta-styryl acrylic acid, an itaconic acid, a citraconic acid, a mesaconic acid, a glutaconic acid, an aconitic acid, a fumaric acid, or a tricarboxy ethylene.

65. The method of claim 60 wherein the olefinically unsaturated carboxylic acid monomers comprise a maleic acid, a maleimide, a diester of maleic acid, a monoester of maleic acid, an amide derivative of maleic acid, an unsubstituted acrylic acid, an alkly acrylic acid, or a derivative thereof.

66. The method of claim 60 wherein the mole ratio of the olefinically unsaturated non-acrylate sulfonate monomers to the olefinically unsaturated carboxylic acid monomers is in the range of from about 10:1 to about 1:10.

67. The method of claim 60 wherein the mole ratio of the olefinically unsaturated non-acrylate sulfonate monomers to the olefinically unsaturated carboxylic acid monomers is in the range of from about 3:1 to about 1:3.

68. The method of claim 60 wherein retarding the cement composition further comprises including a co-set retarder composition in the cement composition.

69. The method of claim 68 wherein the co-set retarder composition comprises an organic acid, a phosphonic acid derivative, an inorganic borate salt, a synthetic polymer, or a combination thereof.

70. The method of claim 60 wherein retarding the set time of the cement composition further comprises including ethylenediamine tetra acetic acid and/or nitrilotriacetic acid in the cement composition.

71. A method of retarding the set time of a cement composition comprising:
providing a cement composition that comprises water and a cement; and
retarding the set time of the cement composition by including a dipolymer retarder in the cement composition, wherein the dipolymer retarder comprises olefinically unsaturated non-acrylate sulfonate monomers and olefinically unsaturated carboxylic acid monomers.

72. The method of claim 71 wherein the dipolymer retarder is added to the cement composition prior the addition of the water or subsequent to the addition of water to the cement composition.

73. The method of claim 71 wherein the copolymer retarder is a styrene sulfonic acid and maleic anhydride copolymer.

74. The method of claim 71 wherein the olefinically unsaturated non-acrylate sulfonate monomers comprise a sulfonated styrene, a vinyltoluenesulfonic acid, a vinyl-napthalenesulfonic acid, an allyloxylbenzenesulfonic acid, a 3-allyloxy-2-hydroxypropane sulfonic acid, and/or an allylsulfonic acid.

75. The method of claim 71 wherein olefinically unsaturated carboxylic acid monomers comprise an acrylic acid, a methacrylic acid, an ethacrylic acid, an alpha-chloro-acrylic acid, an alpha-cyano acrylic acid, an alpha-chloro-methacrylic acid, an alpha-cyano methacrylic acid, a crotonic acid, an alpha-phenyl acrylic acid, a beta-acryloxy propionic acid, a sorbic acid, an alpha-chloro sorbic acid, an angelic acid, a cinnamic acid, a p-chloro cinnamic acid, a beta-styryl acrylic acid, an itaconic acid, a citraconic acid, a mesaconic acid, a glutaconic acid, an aconitic acid, a fumaric acid, or a tricarboxy ethylene.

76. The method of claim 71 wherein the olefinically unsaturated carboxylic acid monomers comprise a maleic acid, a maleimide, a diester of maleic acid, a monoester of maleic acid, an amide derivative of maleic acid, an unsubstituted acrylic acid, an alkly acrylic acid, or a derivative thereof.

77. The method of claim 71 wherein the mole ratio of the olefinically unsaturated non-acrylate sulfonate monomers to the olefinically unsaturated carboxylic acid monomers is in the range of from about 10:1 to about 1:10.

78. The method of claim 71 wherein the mole ratio of the olefinically unsaturated non-acrylate sulfonate monomers to the olefinically unsaturated carboxylic acid monomers is in the range of from about 3:1 to about 1:3.

79. The method of claim 71 wherein retarding the cement composition further comprises including a co-set retarder composition in the cement composition.

80. The method of claim 79 wherein the co-set retarder composition comprises an organic acid, a phosphonic acid derivative, an inorganic borate salt, a synthetic polymer, or a combination thereof.

81. The method of claim 71 wherein retarding the set time of the cement composition further comprises including ethylenediamine tetra acetic acid and/or nitrilotriacetic acid in the cement composition.

82. A method of retarding the set time of a cement composition comprising:
providing a cement composition that comprises water and a cement; and
retarding the set time of the cement composition by including a copolymer retarder and a co-set retarder composition in the cement composition, wherein the copolymer retarder comprises olefinically unsaturated non-acrylate sulfonate monomers and olefinically unsaturated carboxylic acid monomers, wherein the co-set retarder composition consists essentially of an organic acid, a synthetic polymer, or a phosphonic acid derivative in the cement composition.

83. The method of claim 82 wherein the copolymer retarder is added to the cement composition prior the addition of the water or subsequent to the addition of water to the cement composition.

84. The method of claim 82 wherein the copolymer retarder is a styrene sulfonic acid and maleic anhydride copolymer.

85. The method of claim 82 wherein the olefinically unsaturated non-acrylate sulfonate monomers comprise a sulfonated styrene, a vinyltoluenesulfonic acid, a vinylnapthalenesulfonic acid, an allyloxylbenzenesulfonic acid, a 3-allyloxy-2-hydroxypropane sulfonic acid, and/or an allylsulfonic acid.

86. The method of claim 82 wherein olefinically unsaturated carboxylic acid monomers comprise an acrylic acid, a methacrylic acid, an ethacrylic acid, an alpha-chloroacrylic acid, an alpha-cyano acrylic acid, an alpha-chloromethacrylic acid, an alpha-cyano methacrylic acid, a crotonic acid, an alpha-phenyl acrylic acid, a beta-acryloxy propionic acid, a sorbic acid, an alpha-chloro sorbic acid, an angelic acid, a cinnamic acid, a p-chloro cinnamic acid, a beta-styryl acrylic acid, an itaconic acid, a citraconic acid, a mesaconic acid, a glutaconic acid, an aconitic acid, a fumaric acid, or a tricarboxy ethylene.

87. The method of claim 82 wherein the olefinically unsaturated carboxylic acid monomers comprise a maleic acid, a maleimide, a diester of maleic acid, a monoester of maleic acid, an amide derivative of maleic acid, an unsubstituted acrylic acid, an alkly acrylic acid, or a derivative thereof.

88. The method of claim 82 wherein the mole ratio of the olefinically unsaturated non-acrylate sulfonate monomers to the olefinically unsaturated carboxylic acid monomers is in the range of from about 10:1 to about 1:10.

89. The method of claim 82 wherein the mole ratio of the olefinically unsaturated non-acrylate sulfonate monomers to the olefinically unsaturated carboxylic acid monomers is in the range of from about 3:1 to about 1:3.

90. The method of claim 82 wherein the co-set retarder composition comprises an organic acid comprising tartaric acid, gluconic acid, citric acid, gluconoheptanoic acid, ethylenediamine tetra acetic acid, nitrilotriacetic acid, or a combination thereof.

* * * * *